United States Patent
Jia et al.

(10) Patent No.: US 12,088,674 B2
(45) Date of Patent: Sep. 10, 2024

(54) METHOD, ELECTRONIC DEVICE, AND COMPUTER PROGRAM PRODUCT FOR DATA PROCESSING

(71) Applicant: EMC IP Holding Company LLC, Hopkinton, MA (US)

(72) Inventors: Zhen Jia, Shanghai (CN); Anzhou Hou, Shanghai (CN); Danqing Sha, Shanghai (CN); Bin He, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 406 days.

(21) Appl. No.: 17/226,396

(22) Filed: Apr. 9, 2021

(65) Prior Publication Data

US 2022/0294867 A1     Sep. 15, 2022

(30) Foreign Application Priority Data

Mar. 15, 2021   (CN) .......................... 202110276371.2

(51) Int. Cl.
   *G06F 15/16*    (2006.01)
   *G06F 16/783*   (2019.01)
   *H04L 67/131*   (2022.01)

(52) U.S. Cl.
   CPC ........ *H04L 67/131* (2022.05); *G06F 16/7834* (2019.01); *G06F 16/7837* (2019.01)

(58) Field of Classification Search
   CPC . H04L 67/131; G06F 16/7834; G06F 16/7837
   USPC ................................................. 709/203, 231
   See application file for complete search history.

(56) References Cited

U.S. PATENT DOCUMENTS

| 10,063,886 | B2  |   | 8/2018  | Ye et al.                         |
|------------|-----|---|---------|-----------------------------------|
| 2009/0259701 | A1 | * | 10/2009 | Wideman ............ G06F 16/1727 |
| 2012/0002884 | A1 | * | 1/2012  | Ren ........................ G06F 16/58 |
|            |     |   |         | 382/218                           |
| 2015/0012600 | A1 | * | 1/2015  | Chakra ................... H04L 51/18 |
|            |     |   |         | 709/206                           |
| 2019/0342393 | A1 | * | 11/2019 | Bhattacharya .......... H04L 67/61 |

(Continued)

OTHER PUBLICATIONS

M. Chen et al., "Spatiotemporal GMM for Background Subtraction with Superpixel Hierarchy," IEEE Transactions on Pattern Analysis and Machine Intelligence, vol. 40, No. 6, Jun. 2018, 8 pages.

(Continued)

*Primary Examiner* — Duyen M Doan
(74) *Attorney, Agent, or Firm* — Ryan, Mason & Lewis, LLP

(57) ABSTRACT

Embodiments of the present disclosure relate to a method, an electronic device, and a computer program product for data processing. The method for data processing includes: generating, based on a category of a target data content segment, a target tag for the target data content segment; acquiring a reference tag set, a reference tag in the reference tag set being generated based on a category of a historical data content segment; and determining redundancy of the target data content segment based on comparison between the target tag and the reference tag set. In this way, the distribution of a large amount of redundant data from an edge server to a terminal device can be avoided, thereby saving bandwidth, improving delay, and further providing a better user experience for AR/VR content experience.

20 Claims, 4 Drawing Sheets

(56) References Cited

U.S. PATENT DOCUMENTS

| | | | | |
|---|---|---|---|---|
| 2020/0150620 | A1* | 5/2020 | Gray | G05B 19/4183 |
| 2021/0240758 | A1* | 8/2021 | Lee | G06F 40/20 |
| 2021/0274009 | A1* | 9/2021 | Wang | H04W 28/06 |
| 2021/0342927 | A1* | 11/2021 | Morin | G06Q 30/0276 |
| 2022/0122328 | A1* | 4/2022 | Giovannetti | G06T 7/70 |

OTHER PUBLICATIONS

J. Huang et al., "An Efficient Optical Flow Based Motion Detection Method for Non-stationary Scenes," 2019 IEEE Chinese Control and Decision Conference (CCDC), Jun. 3-5, 2019, pp. 5272-5277.

J. Redmon et al., "You Only Look Once: Unified, Real-Time Object Detection," 2016 IEEE Conference on Computer Vision and Pattern Recognitions (CVPR), Jun. 27-30, 2016, 10 pages.

Linux Foundation, Edge, "Akraino," https://www.lfedge.org/projects/akraino/, Accessed Dec. 18, 2020, 4 pages.

A. S. Tosun et al., "Efficient Multi-Layer Coding and Encryption of MPEG Video Streams," Proceedings of Latest Advances in the Fast Changing World of Multimedia, vol. 1, IEEE, 2000, Abstract Only, 2 pages.

U.S. Appl. No. 17/079,632 filed in the name of Zhen Jia et al. on Oct. 26, 2020, and entitled "Method, Device, and Computer Program Product for Managing Virtual Visual Content."

U.S. Appl. No. 17/159,412 filed in the name of Zhen Jia et al. on Jan. 27, 2021, and entitled "Method for Distributing Virtual Visual Content."

\* cited by examiner

METHOD, ELECTRONIC DEVICE, AND COMPUTER PROGRAM PRODUCT FOR DATA PROCESSING

RELATED APPLICATION(S)

The present application claims priority to Chinese Patent Application No. 202110276371.2, filed Mar. 15, 2021, and entitled "Method, Electronic Device, and Computer Program Product for Data Processing," which is incorporated by reference herein in its entirety.

FIELD

Embodiments of the present disclosure generally relate to data processing systems, and more particularly, to a method, an electronic device, and a computer program product for data processing.

BACKGROUND

It is known that augmented reality (AR) and virtual reality (VR) are key use cases in the fifth generation of mobile communication technology (5G) and mobile edge computing (MEC). With the development of 5G/MEC, a 5G network and an edge server may be used to achieve goals of high bandwidth and low delay.

A large amount of data transmitted from the edge server to a terminal device (e.g., AR glasses or a VR helmet), such as 3D models, animations, and interactive content, usually takes up a lot of bandwidth and often introduces delay. In addition, in the process of distributing content, some redundant content, that is, content that has been transmitted to the terminal device, will still be repeatedly transmitted from the edge server to the terminal device.

SUMMARY

Embodiments of the present disclosure relate to an improved solution for data processing. In a first aspect of the present disclosure, a method for data processing is provided. The method includes: generating, based on a category of a target data content segment, a target tag for the target data content segment; acquiring a reference tag set, a reference tag in the reference tag set being generated based on a category of a historical data content segment; and determining redundancy of the target data content segment based on comparison between the target tag and the reference tag set.

In a second aspect of the present disclosure, an electronic device is provided. The electronic device includes: at least one processor; and at least one memory storing computer program instructions, the at least one memory and the computer program instructions being configured to cause, together with the at least one processor, the electronic device to perform actions. The actions include: generating, based on a category of a target data content segment, a target tag for the target data content segment; acquiring a reference tag set, a reference tag in the reference tag set being generated based on a category of a historical data content segment; and determining redundancy of the target data content segment based on comparison between the target tag and the reference tag set.

In a third aspect of the present disclosure, a computer program product is provided. The computer program product is tangibly stored on a non-volatile computer-readable medium and includes computer-executable instructions. When executed, the machine-executable instructions cause a device to perform the method in the first aspect.

It should be understood that the content described in this Summary is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become easily understandable by reading the following detailed description with reference to the accompanying drawings. In the accompanying drawings, several embodiments of the present disclosure are shown in an example rather than restrictive manner, where.

Throughout all the accompanying drawings, the same or similar reference numerals are used to indicate the same or similar components.

DETAILED DESCRIPTION

The principles of the present disclosure will be described below with reference to several example embodiments shown in the accompanying drawings. It should be understood that these specific embodiments are described only for the purpose of enabling a person skilled in the art to better understand and then implement the present disclosure, rather than limiting the scope of the present disclosure in any way.

Figure 1:
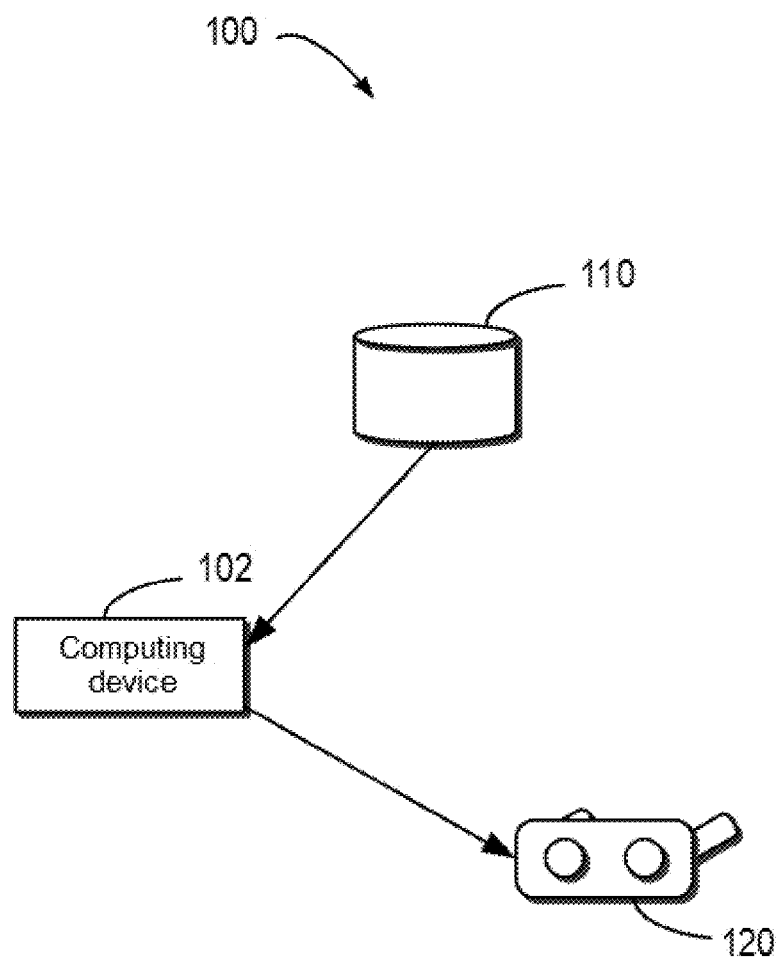
FIG. 1 shows a block diagram of an example system in which an embodiment of the present disclosure may be implemented.

FIG. 1 shows a schematic diagram of example system 100 in which an embodiment of the present disclosure may be implemented.

As shown in FIG. 1, system 100 includes remote device 110. Hereinafter, remote device 110 may also be referred to as edge server 110. Remote device 110 may acquire image and audio content collected by an image collection device or an audio collection device. The image and audio content may be regarded as image and audio content for an AR/VR technology.

System 100 may further include terminal device 120. Terminal device 120 may receive data information from remote device 110. For example, terminal device 120 may perform wired or wireless communication with remote device 110. In the embodiments of the present disclosure, terminal device 120 may be regarded as a wearable device based on the AR/VR technology. For example, terminal device 120 may be an AR head-mounted display device, a VR head-mounted display device, a headset, etc.

System 100 may further include computing device 102. Computing device 102 may process the image and audio content acquired by remote device 110. In some embodiments, computing device 102 may be integrated in remote device 110. In some embodiments, computing device 102 may also be regarded as an external device independent of remote device 110.

For current AR/VR content management, most solutions are still based on a local device, which means that the content has been stored on a terminal device in advance and then processed on the terminal device. This method greatly increases the burden of storing and processing a large amount of data on the terminal device, which affects the lightweight design of the terminal device and is not conducive to saving battery life.

With the development of 5G and edge computing, data and content may be offloaded to an edge server, and data transmission from the edge server to the terminal device can be achieved through a high-bandwidth 5G network. For example, data may be processed by using the edge server first, and then distributed to the terminal device. In this way, the lightweight design of the terminal device can be achieved and the battery life can be saved.

However, the above solution still has certain limitations. For example, as mentioned above, a large amount of data transmitted from the edge server to the terminal device, such as 3D models, animations, and interactive content, usually takes up a lot of bandwidth and often introduces delay. In addition, in the process of distributing content, some redundant content, that is, content that has been transmitted to the terminal device, will still be repeatedly transmitted from the edge server to the terminal device.

As the above data transmission based on the AR/VR technology has requirements for extremely low delay, bandwidth and delay limitations will affect content delivery and reduce user satisfaction with experience content.

Generally speaking, with the growth of data and the requirement of 24×7 service availability, data storage and processing devices are facing challenges in managing and protecting data. Usually, a lot of redundant data is distributed in the Internet of Things (IoT) or 5G or edge/cloud servers, which increases the size of data management and the size of a backup window, and also leads to unnecessary resource consumption, such as data storage, processing and backup storage space, and network bandwidth. Storing a large amount of duplicated data on a remote edge site or cloud for data management and processing also requires a lot of bandwidth.

Therefore, a data deduplication technology has been introduced to achieve the processing of image and audio data content. The common data deduplication process includes three steps, i.e., partitioning a data set into blocks, identifying duplicated blocks, and eliminating redundant blocks. In order to identify the redundant blocks, a data deduplication system creates a hash value or a digital signature, such as a fingerprint, for each data block. It is also possible to create a signature index for a given repository. The index provides a reference list to determine whether the data block exists in the repository. However, the hash-based data deduplication process is computationally intensive, and the degree of intelligence cannot meet the demand.

Therefore, the embodiments of the present disclosure provide a data processing method. The method can generate, based on the category of a current data content segment, a semantic tag for the current data content segment. The semantic tag is compared with a previously obtained reference tag set to determine whether the current data content segment belongs to a redundant data content segment.

Figure 2:
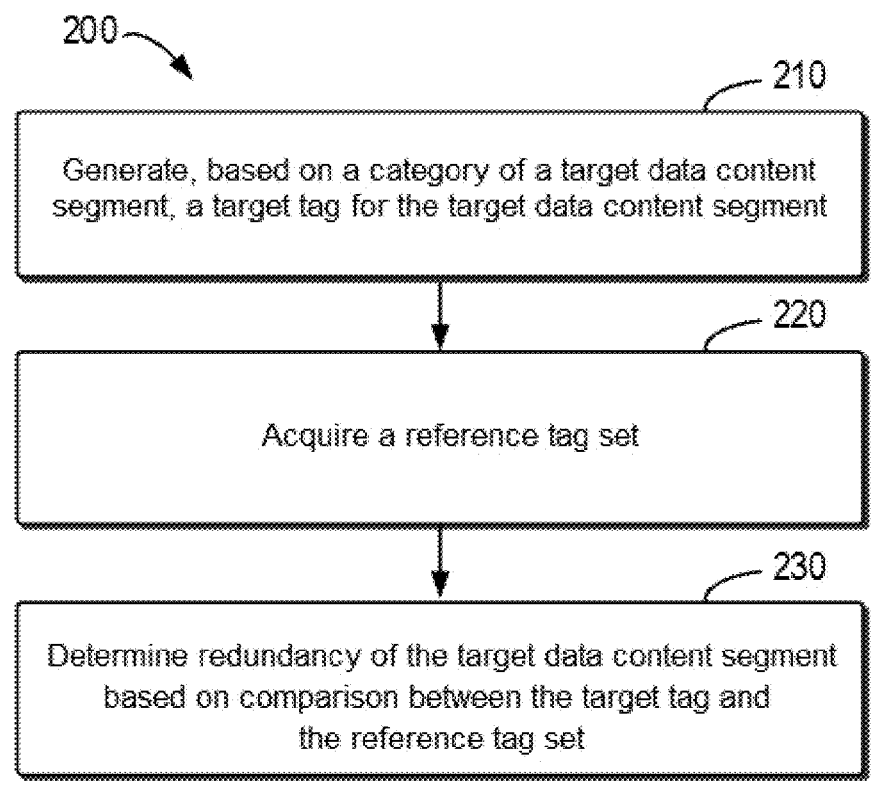
FIG. 2 shows a flow chart of a method 200 for data processing according to an embodiment of the present disclosure.

FIG. 2 shows a flow chart of method 200 for data processing according to some embodiments of the present disclosure. Method 200 may be implemented in system 100 shown in FIG. 1. Method 200 may be implemented by, for example, remote device 110 (e.g., computing device 102 may be integrated in remote device 110) provided in system 100 shown in FIG. 1, or may be implemented by computing device 102 in system 100. Method 200 will be described with reference to FIG. 1.

As shown in FIG. 2, at block 210, if a target data content segment is obtained, computing device 102 may generate, based on a category of the target data content segment, a target tag for the target data content segment.

In some embodiments, feature parameters may be extracted from the target data content segment. If the target data content segment includes image data, the feature parameters may include visual features of an image, such as color, shape, size, and texture. In addition, the feature parameters may also be associated with an object included in the image. For example, the feature parameters may be an object type or an object behavior.

In some embodiments, if the target data content segment includes audio data, the feature parameters may also be an audio element in the audio data. For example, the audio element may be a repeatedly played audio segment in the audio data.

After extracting the feature parameters, computing device 102 may determine the category of the target data content segment based on at least one of the above feature parameters and generate a target tag corresponding to the obtained target data content segment based on the category.

In some embodiments, the extraction of the feature parameters of the target data content segment, the classification of the target content segment, and the generation of a tag for the target content segment may be performed by computer vision and machine learning algorithms. These methods may include, for example, YoLo, SimpleCV, TensorFlow, etc. These algorithms may identify and classify objects, scenes, and behaviors of data content segments. The classified objects, scenes, and behaviors may be defined by semantic tags.

In some embodiments, if the target data content segment includes image data, in order to identify an object, a scene, and a behavior of an image, background subtraction may be used to separate a background layer and a foreground layer of the image. The background subtraction may be, for example, background subtraction based on a Gaussian mixture model. In addition, a method capable of separating the foreground layer and the background layer of the image is motion detection. This method can be used to detect a foreground moving object based on an optical flow motion detection method.

Figure 3:
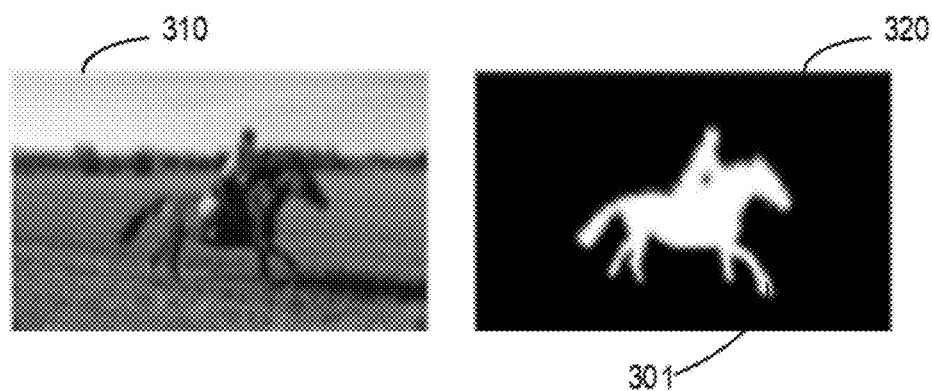
FIG. 3 shows schematic diagrams of an example of processing a target data content segment according to an embodiment of the present disclosure.

FIG. 3 shows schematic diagrams of an example of processing a target data content segment according to an embodiment of the present disclosure. After background subtraction is performed on target data content segment 310, processed target data content segment 320 may be obtained. It can be seen in processed target data content segment 320 that foreground object 301 in target data content segment 310 is extracted.

A trained machine learning model, such as YoLo, may be used to process a foreground layer, a foreground object, or a background layer of the extracted target data content segment. For example, the foreground layer, the foreground object, or the background layer may be used as an input of the machine learning model. The machine learning model may generate a semantic tag for describing the foreground layer, the foreground object, or the background layer, and may use the tag as an output of the machine learning model.

In some embodiments, a target tag corresponding to the target data content segment and generated by the machine learning model may be, for example, provided in the following form:

[foreground layer, visual feature (such as color), object type (such as horse), object ID);
[background layer, visual feature (such as color), object type (such as grassland), object ID).

Referring again to FIG. 2, at block 220, after generating the target tag corresponding to the target data content segment, computing device 102 may generate a reference tag set, a reference tag in the reference tag set being generated based on a category of a historical data content segment.

In some embodiments, the reference tag set may be generated based on a plurality of historical data content segments. Feature parameters may be extracted from the historical data content segment. If the historical data content segment includes image data, the feature parameters may include visual features of an image, such as color, shape, size, and texture. In addition, the feature parameters may also be associated with an object included in the image. For example, the feature parameters may be an object type or an object behavior.

In some embodiments, if the historical data content segment includes audio data, the feature parameters may also be an audio element in the audio data. For example, the audio element may be a repeatedly played audio segment in the audio data.

After extracting the feature parameters, computing device 102 may determine the category of the historical data content segment based on at least one of the above feature parameters and generate a reference tag corresponding to the obtained historical data content segment based on the category.

Figure 4:
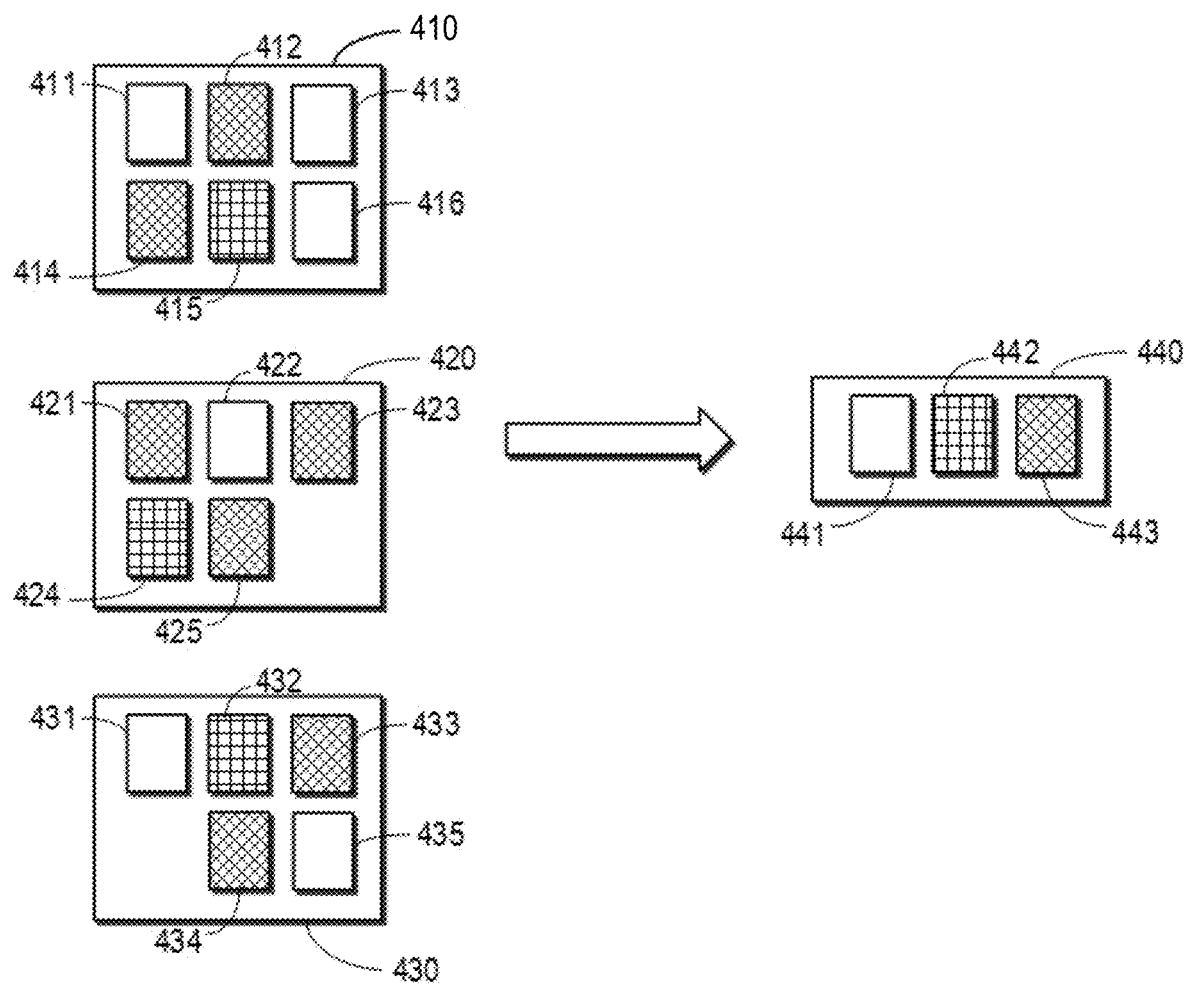
FIG. 4 shows a schematic diagram of processing a historical processing content segment according to an embodiment of the present disclosure.

Computing device 102 generates a reference tag set based on one or more historical data content segments. FIG. 4 shows a schematic diagram of processing a historical processing content segment according to an embodiment of the present disclosure.

As shown in FIG. 4, computing device 102 may obtain a plurality of historical data groups 410, 420, and 430. Each historical data group in the plurality of historical data groups 410, 420, and 430 includes a plurality of historical data content segments, respectively. For example, historical data group 410 includes historical data content segments 411 to 416, historical data group 420 includes historical data content segments 421 to 425, and historical data group 430 includes historical data content segments 431 to 435.

By deleting the historical data content segments with duplicated tags after identifying feature parameters of the plurality of historical data content segments, classifying the historical data content segments, and generating tags for describing the historical data content segments, historical data content segment set 440 to be sent to terminal device 120 is obtained. Historical data content segment set 440 may include historical data content segments 441 to 443.

In some embodiments, the extraction of the feature parameters of the historical data content segments, the classification of the historical content segments, and the generation of a reference tag set based on the classification may be performed by computer vision and machine learning algorithms. These methods may include, for example, YoLo, SimpleCV, TensorFlow, etc. This process is similar to the process and method of processing the target data content segment already described above, and therefore, descriptions are omitted herein.

In some embodiments, a tag set associated with historical data content segments 441 to 443 retained after processing may be regarded as a reference tag set for processing subsequent data content segments. The reference tag set may be stored at remote device 110 as metadata.

In some embodiments, the reference tag set may be sent to terminal device 120 as metadata along with historical data content segments 441 to 443 retained after processing.

It can be seen that, compared to the number of unprocessed historical data content segments, the number of historical data content segments retained after processing is significantly reduced. Therefore, the situation of delay in data transmission can be improved. Meanwhile, the transmission bandwidth can be saved. It is also beneficial for the power saving of the terminal device and the improvement of system performance.

Returning to FIG. 2 again, at block 230, computing device 102 may determine the redundancy of the target data content segment based on the comparison between the target tag and the reference tag set.

In some embodiments, computing device 102 may determine whether there is a historical data content segment matching the target data content segment in a historical data content segment set corresponding to the reference tag set by comparing the target tag and the reference tag set.

If computing device 102 determines that there is no matching historical data content segment, the target data content segment is determined as a non-redundant data content segment. If computing device 102 determines that there is a matching historical data content segment, the target data content segment is determined as a redundant data content segment.

In some embodiments, if it is determined that the target data content segment is a non-redundant data content segment, the target data content segment may be sent to the terminal device.

In some embodiments, the target tag generated based on the target data content segment may be added to the reference tag set generated based on the historical data content segment.

In some embodiments, if it is determined that the target data content segment is a redundant data content segment, the target data content segment will be deleted.

In the embodiments of the present disclosure, a framework for managing AR/VR content using an MEC/5G environment is implemented to achieve efficient data processing, content management, and distribution. Through this framework, the computing burden on the terminal device can be reduced, and the customer experience of mobility, efficiency, and immersive experience can also be improved.

In addition, the embodiments of the present disclosure introduce a concept of data deduplication. Instead of distributing all data to all terminal devices, the concept of data deduplication in data storage and data production is used to check whether a data block has been distributed before. If the data block has already been distributed, redistribution will be refrained to reduce redundancy. The data deduplication process may be implemented using computer vision processing and machine learning algorithms. For example, content in AR/VR is understood and classified through a machine learning model, and then a tag is added as metadata for deduplication. Different from the conventional hash library deduplication, the method of the embodiments of the present disclosure can fully understand the meaning of the content, and provide more efficient data processing for AR/VR content distribution.

Figure 5:
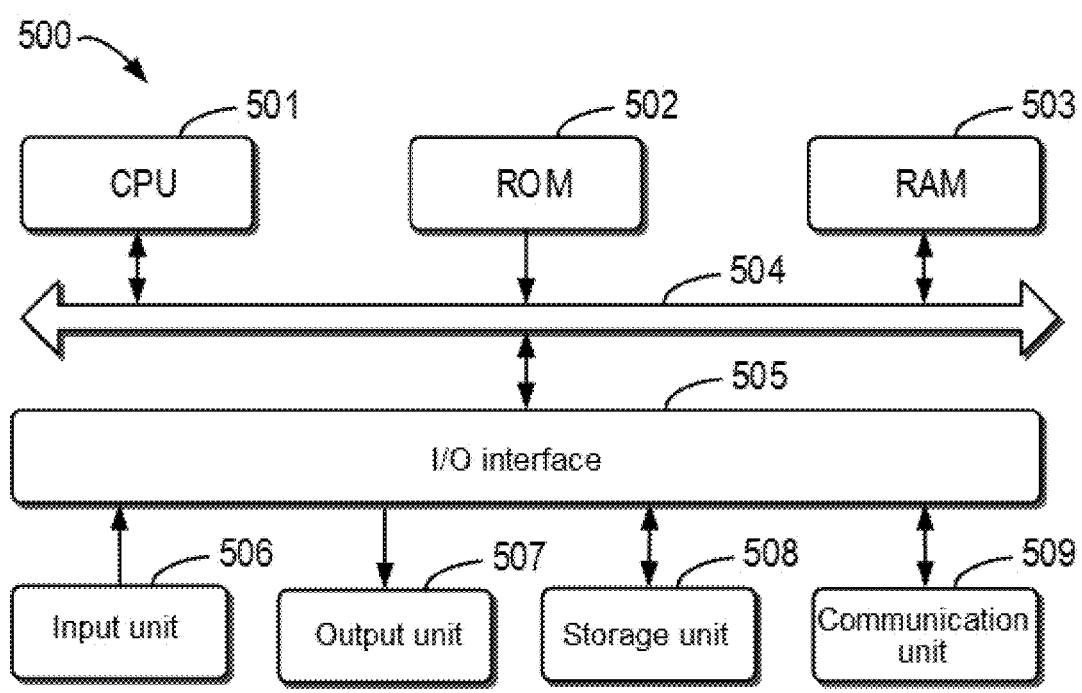
FIG. 5 shows a block diagram of a device that may be used to implement an embodiment of the present disclosure.

FIG. 5 schematically shows a block diagram of device 500 that can be used to implement an embodiment of the present disclosure. Device 500 may be implemented as or included in remote device 110 or computing device 102 of FIG. 1.

As shown in FIG. 5, device 500 includes central processing unit (CPU) 501 that may perform various appropriate actions and processing according to computer program instructions stored in read-only memory (ROM) 502 or computer program instructions loaded from storage unit 508 into random access memory (RAM) 503. In RAM 503, various programs and data required for the operation of device 500 may also be stored. CPU 501, ROM 502, and RAM 503 are connected with each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

The various processes and processing described above, such as method 200, may be performed by CPU 501. For example, in some embodiments, method 200 may be implemented as a computer software program that is tangibly included in a machine-readable medium, for example, storage unit 508. In some embodiments, part or all of the computer program may be loaded and/or installed to device 500 via ROM 502 and/or communication unit 509. When the computer program is loaded onto RAM 503 and executed by CPU 501, one or more steps of method 200 described above may be performed.

As used herein, the term "include" and similar terms thereof should be understood as open-ended inclusion, i.e., "including but not limited to." The term "based on" should be understood as "based at least in part on." The term "one embodiment" or "this embodiment" should be understood as "at least one embodiment." The terms "first," "second," and the like may refer to different or identical objects. Other explicit and implicit definitions may also be included below.

As used herein, the term "determine" encompasses a variety of actions. For example, "determine" may include operating, computing, processing, exporting, surveying, lookup (for example, looking up in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part can be implemented using dedicated logic; the software part can be stored in a memory and executed by an appropriate instruction execution system, such as a micro-processor or dedicated design hardware. Those skilled in the art can understand that the above-mentioned devices and methods can be implemented by using computer-executable instructions and/or by being included in processor control code which, for example, is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flow charts can be changed. Additionally or alternatively, some steps may be omitted, multiple steps may be combined into one step for execution, and/or one step may be decomposed into multiple steps for execution. It should also be noted that features and functions of two or more apparatuses according to the present disclosure may be embodied in one apparatus. Conversely, the features and functions of one apparatus described above can be embodied by further dividing the apparatus into multiple apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the appended claims.

What is claimed is:

1. A method, comprising:
    generating, based on a category of a target data content segment requested by a terminal device, a target tag for the target data content segment;
    acquiring a reference tag set, the reference tag set being generated at least in part by processing a plurality of distinct historical data groups comprising respective distinct sets of historical data content segments, the processing comprising identifying historical data content segments of the respective distinct sets of historical data content segments having duplicate content tags in the distinct historical data groups and deduplicating the historical data content segments of the respective distinct sets of historical data content segments by including in the reference tag set a plurality of reference tags for respective selected instances of the historical data content segments identified as having duplicate content tags in the distinct historical data groups, a reference tag in the reference tag set being generated based on a category of a historical data content segment previously provided to the terminal device; and
    determining redundancy of the target data content segment based on comparison between the target tag and the reference tag set;
    wherein the generating, acquiring and determining are performed in at least one computing device associated with an edge server;
    wherein the at least one computing device associated with the edge server implements a trained machine learning model, the trained machine learning model being configured to process at least one of a foreground layer, a foreground object and a background layer of at least one image of the target data content segment requested by the terminal device, to generate at least a portion of the target tag as a semantic tag characterizing the at least one of the foreground layer, the foreground object and the background layer; and
    wherein a result of the determining is utilized to control whether or not at least a portion of the target data content segment is provided from the edge server to the terminal device.

2. The method according to claim 1, wherein determining the redundancy of the target data content segment comprises:

determining, based on the comparison between the target tag and the reference tag set, whether there is a historical data content segment matching the target data content segment in a historical data content segment set corresponding to the reference tag set; and determining, when determining that there is no matching historical data content segment, the target data content segment as a non-redundant data content segment.

3. The method according to claim 2, further comprising: sending the target data content segment to the terminal device.

4. The method according to claim 2, further comprising: adding the target tag to the reference tag set.

5. The method according to claim 2, further comprising: determining, when determining that there is a matching historical data content segment, the target data content segment as a redundant data content segment.

6. The method according to claim 1, wherein generating the target tag comprises:

extracting at least one of the following parameters from the target data content segment:

visual features of an image, an object type in the image, an object behavior in an image, and audio elements;

determining the category of the target data content segment based on the at least one parameter; and generating a target tag corresponding to the target data content segment based on the determined category.

7. The method according to claim 1, wherein acquiring the reference tag set comprises:

extracting at least one of the following parameters from a historical data content segment:

visual features of an image, an object type in the image, an object behavior in an image, and audio elements;

determining the category of the historical data content segment based on the at least one parameter; and generating the reference tag corresponding to the historical data content segment based on the determined category.

8. The method according to claim 7, further comprising: sending the historical data content segment and the reference tag set to the terminal device.

9. The method according to claim 1, wherein the terminal device comprises at least one of the following:

an augmented reality (AR) head-mounted display device, a virtual reality (VR) head-mounted display device, or a headset.

10. An electronic device, comprising:

at least one processor; and a memory coupled to the at least one processor and storing instructions for execution by the processor, wherein the instructions, when executed by the at least one processor, cause the electronic device to perform actions comprising:

generating, based on a category of a target data content segment requested by a terminal device, a target tag for the target data content segment;

acquiring a reference tag set, the reference tag set being generated at least in part by processing a plurality of distinct historical data groups comprising respective distinct sets of historical data content segments, the processing comprising identifying historical data content segments of the respective distinct sets of historical data content segments having duplicate content tags in the distinct historical data groups and deduplicating the historical data content segments of the respective distinct sets of historical data content segments by including in the reference tag set a plurality of reference tags for respective selected instances of the historical data content segments identified as having duplicate content tags in the distinct historical data groups, a reference tag in the reference tag set being generated based on a category of a historical data content segment previously provided to the terminal device; and determining redundancy of the target data content segment based on comparison between the target tag and the reference tag set;

wherein the generating, acquiring and determining are performed in at least one computing device associated with an edge server;

wherein the at least one computing device associated with the edge server implements a trained machine learning model, the trained machine learning model being configured to process at least one of a foreground layer, a foreground object and a background layer of at least one image of the target data content segment requested by the terminal device, to generate at least a portion of the target tag as a semantic tag characterizing the at least one of the foreground layer, the foreground object and the background layer; and wherein a result of the determining is utilized to control whether or not at least a portion of the target data content segment is provided from the edge server to the terminal device.

11. The electronic device according to claim 10, wherein determining the redundancy of the target data content segment comprises:

determining, based on the comparison between the target tag and the reference tag set, whether there is a historical data content segment matching the target data content segment in a historical data content segment set corresponding to the reference tag set; and determining, when determining that there is no matching historical data content segment, the target data content segment as a non-redundant data content segment.

12. The electronic device according to claim 11, wherein the actions further comprise:

sending the target data content segment to the terminal device.

13. The electronic device according to claim 11, wherein the actions further comprise:

adding the target tag to the reference tag set.

14. The electronic device according to claim 11, wherein the actions further comprise:

determining, when determining that there is a matching historical data content segment, the target data content segment as a redundant data content segment.

15. The electronic device according to claim 10, wherein generating the target tag comprises:

extracting at least one of the following parameters from the target data content segment:

visual features of an image, an object type in the image, an object behavior in an image, and audio elements;

determining the category of the target data content segment based on the at least one parameter; and generating a target tag corresponding to the target data content segment based on the determined category.

16. The electronic device according to claim 10, wherein acquiring the reference tag set comprises:

extracting at least one of the following parameters from a data content segment:
visual features of an image,
an object type in the image,
an object behavior in an image, and
audio elements;
determining the category of the historical data content segment based on the at least one parameter; and
generating the reference tag corresponding to the historical data content segment based on the determined category.

17. The electronic device according to claim 16, wherein the actions further comprise:
sending the historical data content segment and the reference tag set to the terminal device.

18. The electronic device according to claim 10, wherein the terminal device comprises at least one of the following:
an augmented reality (AR) head-mounted display device,
a virtual reality (VR) head-mounted display device, or
a headset.

19. A computer program product tangibly stored on a non-transitory computer-readable medium and comprising machine-executable instructions, wherein the machine-executable instructions, when executed, cause a machine to perform actions comprising:
generating, based on a category of a target data content segment requested by a terminal device, a target tag for the target data content segment;
acquiring a reference tag set, the reference tag set being generated at least in part by processing a plurality of distinct historical data groups comprising respective distinct sets of historical data content segments, the processing comprising identifying historical data content segments of the respective distinct sets of historical data content segments having duplicate content tags in the distinct historical data groups and deduplicating the historical data content segments of the respective distinct sets of historical data content segments by including in the reference tag set a plurality of reference tags for respective selected instances of the historical data content segments identified as having duplicate content tags in the distinct historical data groups, a reference tag in the reference tag set being generated based on a category of a historical data content segment previously provided to the terminal device; and
determining redundancy of the target data content segment based on comparison between the target tag and the reference tag set;
wherein the generating, acquiring and determining are performed in at least one computing device associated with an edge server;
wherein the at least one computing device associated with the edge server implements a trained machine learning model, the trained machine learning model being configured to process at least one of a foreground layer, a foreground object and a background layer of at least one image of the target data content segment requested by the terminal device, to generate at least a portion of the target tag as a semantic tag characterizing the at least one of the foreground layer, the foreground object and the background layer; and
wherein a result of the determining is utilized to control whether or not at least a portion of the target data content segment is provided from the edge server to the terminal device.

20. The computer program product according to claim 19, wherein determining the redundancy of the target data content segment comprises:
determining, based on the comparison between the target tag and the reference tag set, whether there is a historical data content segment matching the target data content segment in a historical data content segment set corresponding to the reference tag set; and
determining, when determining that there is no matching historical data content segment, the target data content segment as a non-redundant data content segment.

* * * * *